(12) United States Patent
Mountz et al.

(10) Patent No.: US 8,972,045 B1
(45) Date of Patent: Mar. 3, 2015

(54) INTER-FACILITY TRANSPORT IN INVENTORY MANAGEMENT AND FULFILLMENT SYSTEMS

(71) Applicant: Amazon Technologies, Inc., Reno, NV (US)

(72) Inventors: Michael Cordell Mountz, Lexington, MA (US); Oleksandr Glazkov, Boston, MA (US); Timothy Aaron Bragg, Woburn, MA (US); Matthew David Verminski, North Andover, MA (US); Jeremiah David Brazeau, Hudson, NH (US); Peter R. Wurman, Acton, MA (US); John W. Cullen, Boston, MA (US); Michael T. Barbehenn, North Reading, MA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/034,255

(22) Filed: Sep. 23, 2013

(51) Int. Cl.
  G06F 7/00 (2006.01)
  G06Q 10/08 (2012.01)
(52) U.S. Cl.
  CPC .................................. *G06Q 10/087* (2013.01)

USPC .......... 700/216; 700/213; 700/214; 700/215; 700/217; 700/228; 700/229

(58) Field of Classification Search
  CPC ... G06Q 10/087; G06Q 10/08; G06Q 10/083; G05D 2201/0216; G05D 1/021; G05B 13/00
  See application file for complete search history.

(56) References Cited

U.S. PATENT DOCUMENTS 8,190,660 B2 *  5/2012  Harel et al. ................... 707/829
8,311,902 B2 * 11/2012  Mountz et al. .................. 705/28

* cited by examiner

*Primary Examiner* — Yolanda Cumbess
(74) *Attorney, Agent, or Firm* — Lee & Hayes, PLLC

(57) ABSTRACT

In an infrastructure that uses a mobile order fulfillment system, robotic drive units may be dispatched and instructed to bring inventory holders to a workstation where at least one of the inventory holders is packed and prepared for shipment. The robotic drive units are then instructed to move the prepared inventory holder to a transport vehicle such as a truck. Fiducial marks may be removably placed within the transport vehicle to aid navigation of the robotic drive units. At a destination facility, additional robotic drive units may be instructed to move the inventory holders from the truck and place the inventory holders at appropriate storage locations.

22 Claims, 9 Drawing Sheets

INTER-FACILITY TRANSPORT IN INVENTORY MANAGEMENT AND FULFILLMENT SYSTEMS

BACKGROUND

Modern inventory systems, such as those used in mail order warehouses, supply chain distribution centers, airport luggage systems, and custom-order manufacturing facilities face significant challenges in responding to requests for inventory items. As inventory systems grow, the challenges of simultaneously completing large numbers of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

Increasingly, mobile order fulfillment systems are used within inventory facilities to address these and other concerns. A mobile order fulfillment system may provide automation for bringing ordered items to central workstations for workers to select and pack the ordered items in preparation for shipping. Mobile order fulfillment systems such as this can greatly increase efficiencies within an order fulfillment facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Described herein is an inventory management system that uses robotic drive units to move inventory items within and between storage facilities. Inventory items are stored in portable inventory holders. In order to move items from one facility to another, robotic drive units bring various inventory holders to a workstation where desired items are transferred to an inventory holder that is to be shipped to another facility. One of the robotic drive units is then instructed to move the newly stocked inventory holder to a transport vehicle for loading. In some cases, the robotic drive unit may be instructed to enter the transport vehicle and to place the stocked inventory holder within the transport vehicle. Robotic drive units may be used similarly at a receiving facility to unload portable inventory holders from transport vehicles and to distribute inventory items to inventory holders throughout the receiving facility.

Figure 1:
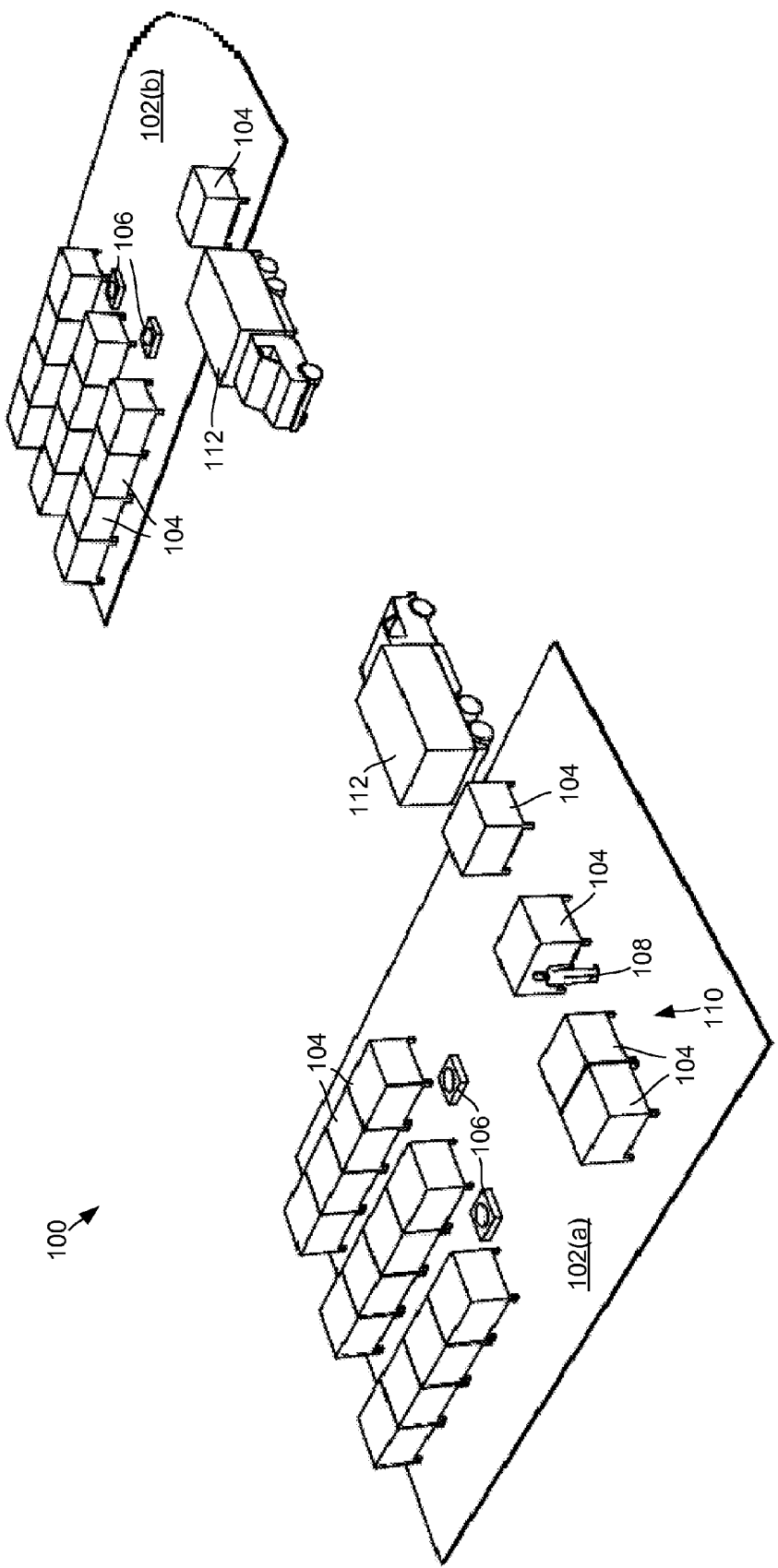
FIG. 1 is a figurative perspective diagram of an inventory storage and order fulfillment system that includes two inventory facilities.

FIG. 1 illustrates the components of an inventory storage and order fulfillment system or infrastructure 100 that includes a plurality of inventory facilities 102. For purposes of discussion, two inventory facilities 102(a) and 102(b) are illustrated, although the infrastructure 100 may include any number of inventory facilities or areas.

The inventory facilities 102 are used to store inventory items that are ordered by and shipped to customers or other entities. In the described embodiment, each of the inventory facilities 102 uses an automated robotic mobile fulfillment system in which inventory items are stored in portable inventory holders 104 and moved about the facility 102 by unmanned robotic drive units 106. For example, inventory holders 104 may be moved to a human worker 108 so that the worker can manually retrieve or "pick" ordered items from the inventory holders 104 under the direction of the order fulfillment system.

As a specific example, a received order may specify a plurality of inventory items. In response to such an order, the inventory holders 104 containing the inventory items may be moved by the robotic drive units 106 to a workstation or other area 110. At the workstation 110, the worker 108 may be directed by the order fulfillment system to retrieve certain inventory items that have been ordered. In certain embodiments, the ordered items or the locations of the ordered items on the inventory holders 104 may be listed or visually indicated so that the worker 108 knows which items to retrieve. As an example, locations on the inventory holders 104 may be indicated by illumination, such as laser illumination, to show the worker 108 the locations from which to retrieve items. As yet another example, the inventory holder 104 may have integral indicators or readouts that are controlled by the system to inform the worker 108 regarding the locations from which ordered inventory items are to be retrieved.

In some implementations, inventory items retrieved in this manner may be placed on an additional inventory holder 104 that contains one or more outgoing orders. Once completed, the additional inventory holder 104 may be moved by a robotic drive unit 106 to a shipping workstation or other processing point. As will be described in more detail below, certain inventory holders 104 that have been loaded with specified inventory items may also be moved to or onto a transport vehicle for shipment to a different inventory facility.

As another example, inventory restocking may be performed when receiving new inventory at an inventory facility 102. The mobile fulfillment system identifies one or more inventory holders 104 that are to be used for storage of the incoming inventory items. The robotic drive units 106 bring the identified inventory holders 104 to the worker 108 at the location of the new inventory items. The worker 108, under the direction of the mobile fulfillment system, can then load the new inventory items onto the inventory holders 104 at locations specified by the order fulfillment system. After being loaded, robotic drive units 106 may be used to move the inventory holders 104 to appropriate locations within the inventory facility 102, from where they may be retrieved for later use in fulfilling future orders.

In the illustrated embodiment, similar or identical mobile fulfillment systems are used in each of the two inventory facilities 102(a) and 102(b). The two inventory facilities 102(a) and 102(b) may be separate or geographically distant facilities of a single entity such as two order fulfillment facilities of an online retailer. Alternatively, the two facilities may be facilities of two different businesses, such as a retailer and a supplier. In either case, inventory items may at times be moved from the first inventory facility 102(a) to the second inventory facility 102(b) using an inter-facility or inter-area freight transporter such as a road vehicle or truck 112. Inventory items may be loaded onto the freight transporter 112 at the first inventory facility 102(a) and unloaded at the second inventory facility 102(b).

In certain embodiments, the inventory holders 104 may be used to transfer inventory items from the first inventory facility 102(a) to the second inventory facility 102(b). As an example, existing, previously stocked inventory holders 104 may be moved from one inventory facility to another by the freight transporter 112 in order to balance inventories between multiple locations. As another example, an order may specify certain inventory items to be transferred from multiple inventory holders 104 of first the facility 102(a) to the second facility 102(b). An order such as this may be fulfilled by stocking an inventory holder at the first facility with the inventory items that are to be transferred, and then moving the newly stocked inventory holder to the second facility.

As illustrated by FIG. 1, the robotic drive units 106 may be used to move the inventory holders 104 to and from the freight transporter 112. The inventory holders 104 may be placed on or within the freight transporter 112 and moved between inventory facilities 102 with the freight transporter. In some cases, the robotic drive units 106 may move the inventory holders 104 on to and off of the freight transporter 112 by entering the freight transporter 112. In other cases, the robotic drive units 106 may move the inventory holders 104 to and from a loading dock adjacent the freight transporter 112, and other equipment may be used to move the inventory holders into and out of the freight transporter 112.

Figure 2:
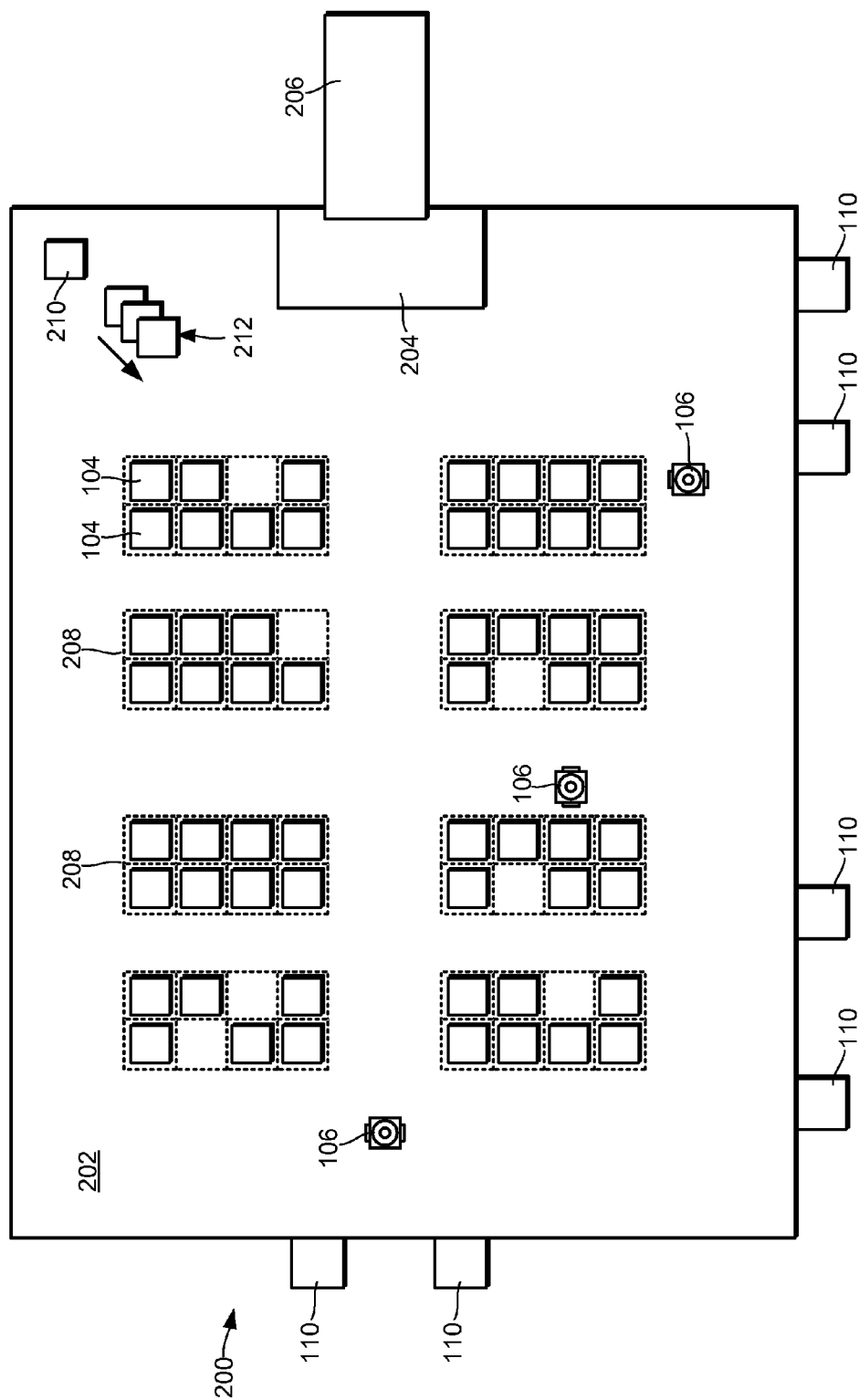
FIG. 2 is a block diagram illustrating an example configuration of an inventory management and order fulfillment system that may be implemented within each of the inventory facilities of FIG. 1.

FIG. 2 illustrates an example configuration of an inventory management and/or order fulfillment system 200 that may be implemented within each of the inventory facilities 102 described above. In the system 200 of FIG. 2, the robotic drive units 106 are used to transport the inventory holders 104 between points within a workspace 202 of an inventory facility. The workspace may include workstations 110, one or more loading docks 204, and cargo compartments 206 of one or more transport vehicles such as the freight transporter 112 of FIG. 1. The workspace 202 may also include designated locations 208 for placement and storage of the inventory holders 104.

The robotic drive units 106 move the inventory holders 104 between locations within the workspace 202 under the general direction and control of a management component 210, which is also referred to herein as control logic 210. The management component 210 keeps track of the inventory holders 104 and their locations within the associated workspace. In addition, the management component 210 monitors inventory of the inventory facility, keeps track of the inventory items held by each of the inventory holders 104, and also keeps track of the specific locations of the inventory items within the inventory holders.

The management component 220 also assigns tasks 212 to the robotic drive units 106 and other components of the system and coordinates operation of the robotic drive units 106 in completing the tasks 212. The tasks 212 may relate not only to the movement and processing of inventory holders 104, but also to the management and maintenance of the components of the system 200. For example, the management component 210 may assign portions of the workspace 202 as parking spaces for the robotic drive units 106, the scheduled recharge or replacement of robotic drive unit batteries, the storage of empty inventory holders 104, or any other operations associated with the functionality supported by the system 200 and its various components.

The management component 220 also supervises or directs manual operations, such as by indicating which items of an inventory holder 104 are to be selected or "picked" by a worker, and where the selected items are to be placed (such as at a specified location in another inventory holder).

Although shown in FIG. 2 as a single, discrete component, the management component 210 may represent multiple components and may represent or include portions of the robotic drive units 106 or other elements of the system 200. As a result, any or all of the interaction between a particular robotic drive unit 106 and the management module 210 that is described below may in particular embodiments represent peer-to-peer communication between that robotic drive unit 106 and one or more other robotic drive units 106. In addition, the control logic 210 may be shared between facilities, so that multiple facilities are under the control of a single management module or a set of cooperating management modules.

The robotic drive units 106 may comprise any devices or components appropriate for use in the system 200 based on the characteristics and configuration of the inventory holders 104 and/or other elements of the system 200. In a particular embodiment, the robotic drive units 106 are self-powered, wheeled devices configured to move autonomously about the workspace 202 without direct human supervision. In general, the robotic drive units 106 may be powered, propelled, and controlled in any manner appropriate based on the configuration and characteristics of the system 200.

The robotic drive units 106 may be capable of communicating with the management component 210 to receive information identifying selected inventory holders 104, to transmit the locations of the robotic drive units 106, and/or to exchange any other suitable information to be used by the management component 210 or the robotic drive units 106 during operation. The robotic drive units 106 may communicate with the management component 210 wirelessly or in any other appropriate manner. As one example, particular embodiments of the robotic drive unit 106 may communicate with the management component 210 and/or with one another using 802.11, Bluetooth, or Infrared Data Association (IrDA) standards, or any other appropriate wireless communication protocol. Furthermore, as noted above, the management component 210 may include components of individual robotic drive units 106. Thus, for the purposes of this description and the claims that follow, communications between the management component 210 and a particular robotic drive unit 106 may represent communication between components of a particular robotic drive unit 106.

The inventory holders 104 store inventory items. Inventory items may comprise any objects suitable for storage, retrieval, and/or processing by the system 200. In a particular embodiment, the inventory holders 104 include multiple storage bins with each storage bin capable of holding one or more types of inventory items. The inventory holders 104 are capable of being carried, rolled, and/or otherwise moved by the robotic drive units 106.

In an example implementation, the system 200 may be implemented by a mail or online order warehouse facility, and inventory items may comprise merchandise stored in the warehouse facility. During operation, the robotic drive units 106 may retrieve inventory holders 104 containing one or more inventory items requested in an order to be packed for delivery to a customer. Moreover, in particular embodiments of the system 200, boxes containing completed orders may themselves represent inventory items.

As another example, the system 200 may be implemented by a merchandise-return facility. In such an embodiment, inventory items may represent merchandise returned by customers. Units of these inventory items may be stored in the inventory holders 104 when received at the workspace 202. At appropriate times, a large number of units may be removed from a particular inventory holder 104 and packed for shipment back to a warehouse or other facility. For example, individual units of a particular inventory item may be received and stored in the inventory holders 104 until a threshold number of units of that inventory item have been received. The robotic drive units 106 may then be tasked with retrieving an inventory holder 104 in this state. The inventory holder 104 may then be shipped to another facility, such as a mail-order warehouse.

As another example, the system 200 may be implemented by an airport luggage facility. In such an embodiment, inventory items may represent pieces of luggage stored in the luggage facility. The robotic drive units 106 may retrieve inventory holders storing luggage that is arriving and/or departing on particular flights or luggage that is destined for particular types of processing, such as x-ray or manual searching. The system 200 may be similarly implemented within duties or customs facilities for tracking and transferring freight items.

As yet another example, the system 200 may be implemented by a manufacturing facility, and inventory items may represent individual components of a manufacturing kit. More specifically, inventory items may represent components intended for inclusion in an assembled product, such as electronic components for a customized computer system. In such an embodiment, the system 200 may retrieve particular components identified by a specification associated with an order for the product so that a customized version of the product can be built.

More generally, the system 200 may be implemented by or within any facility or system for storing and processing inventory items, and inventory items may represent objects of any type suitable for storage, retrieval, and/or processing in a particular system 200.

The workstations 110 may comprise locations designated for the completion of particular tasks involving inventory items. Such tasks may include the removal of inventory items from the inventory holders 104, the introduction of inventory items into the inventory holders 104, the counting of inventory items in the inventory holders 104, the decomposition of inventory items (e.g. from pallet or case-sized groups to individual inventory items), and/or the processing or handling of inventory items in any other suitable manner. In particular embodiments, the workstations 110 may represent the physical locations where a particular task involving inventory items can be completed within the workspace 202. In alternative embodiments, the workstations 110 may represent both the physical location and also any appropriate equipment for processing or handling inventory items, such as scanners for monitoring the flow of inventory items in and out of the system 200, communication interfaces for communicating with the management component 210, and/or any other suitable components.

The workstations 110 can be controlled, entirely or in part, by human workers or may be fully automated. Moreover, the human or automated operators of the workstations 110 may be capable of performing certain tasks with respect to inventory items, such as packing or counting inventory items, as part of the operation of the system 200. In the case of human operators, the system 200 may provide detailed instructions or directions regarding activities to be performed. Instructions may be provided verbally, though a control panel, or by indications on the inventory holders or inventory items themselves. Generally, a worker may be instructed to pick an item from a specified location of an inventory holder and to then place the item at another specified location, such as at a specified location within another inventory holder.

The workspace 202 may include an area associated with the system 200 in which the robotic drive units 106 can move and/or the inventory holders 104 can be stored. For example, the workspace 202 may represent all or part of the floor of a mail-order warehouse in which the system 200 operates. Although FIG. 2 shows an embodiment of the system 200 in which workspace 202 includes a fixed, predetermined, and finite physical space, particular embodiments of the system 200 may include unmanned robotic drive units 106 and inventory holders 104 that are configured to operate within a workspace 202 that is of variable dimensions and/or an arbitrary geometry. Also, while the workspace 202 may be enclosed in a building, alternative embodiments may utilize workspaces 202 in which some or all of the workspace 202 is located outdoors, within a vehicle (such as a cargo ship), or otherwise unconstrained by any fixed structure. Moreover, in particular embodiments, the workspace 202 may include multiple portions that are physically separated from one another, including but not limited to separate floors, rooms, buildings, and/or portions divided in any other suitable manner.

When moving the inventory holders 104 to different locations within the workspace 202, the robotic drive units 106 may dock with and transport the inventory holders 104. The robotic drive units 106 may dock with the inventory holders 104 by connecting to, lifting, and/or otherwise interacting with the inventory holders 104 or in any other suitable manner so that, when docked, the robotic drive units 106 are coupled to and/or support the inventory holders 104 and can move the inventory holders 104 within the workspace 202. While the description below focuses on particular embodiments of the robotic drive unit 106 and inventory holder 104 that are configured to dock in a particular manner, alternative embodiments of robotic drive unit 106 and inventory holder 104 may be configured to dock in any manner suitable to allow the robotic drive unit 106 to move an inventory holder 104 within the workspace 202. Additionally, as noted below, in particular embodiments the robotic drive units 106 may represent all or portions of the inventory holders 104. In such embodiments, the robotic drive units 106 may not dock with inventory holders 104 before transporting the inventory holders 104 and/or the robotic drive units 106 may each remain continually docked with a particular inventory holder 104.

Figure 3:
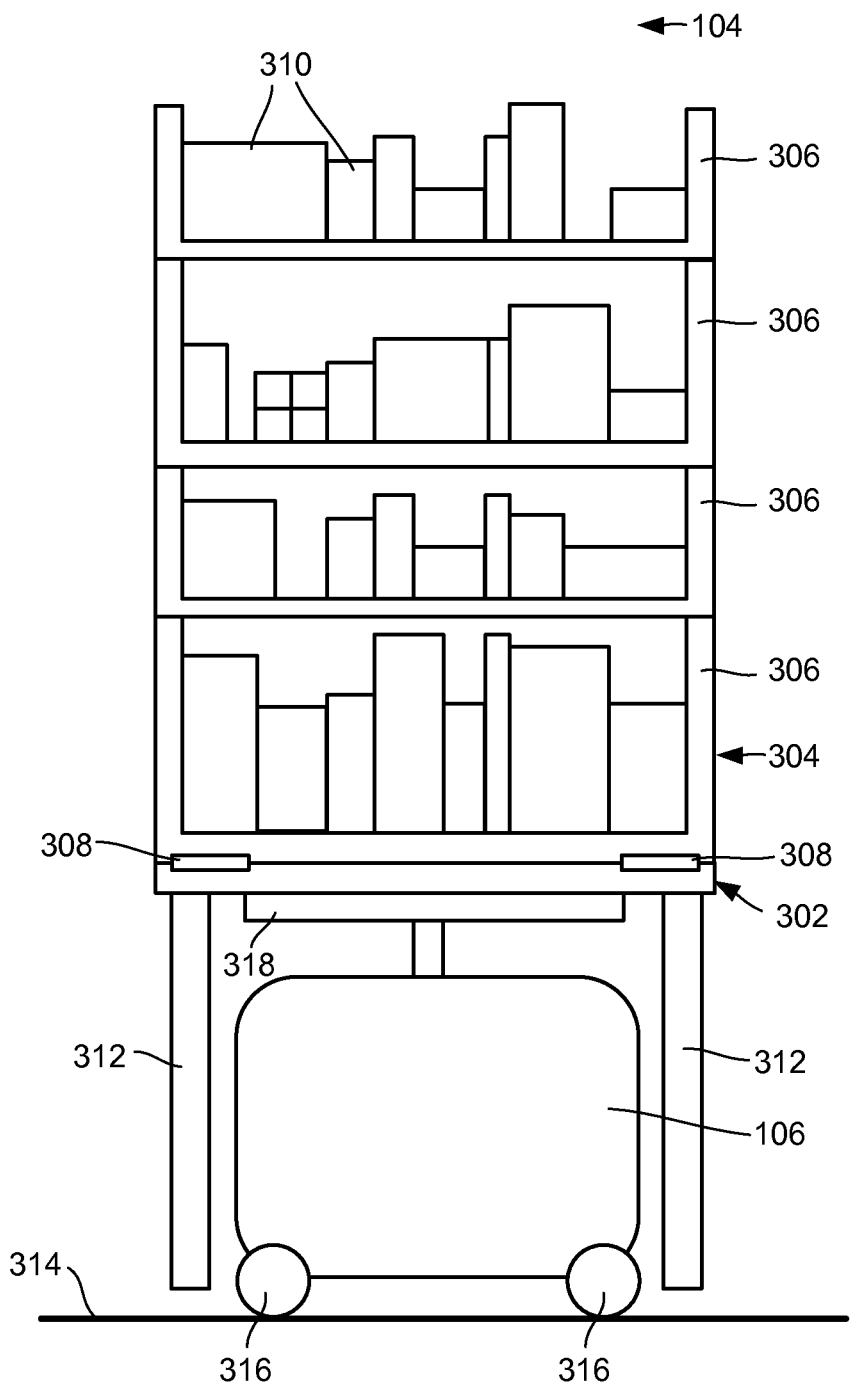
FIG. 3 is a side view showing an example inventory holder and robotic drive unit that may be used in the systems of FIGS. 1 and 2.

FIG. 3 illustrates an example implementation of an inventory holder 104 and a robotic drive unit 106. The inventory holder 104 includes a base or base portion 302 and a storage portion 304. The storage portion may comprise one or more bins or shelves 306. The bins or shelves 306 may be formed integrally with the base 302 and with each other, or may comprise separate stackable trays that are detachable from each other and/or from the base portion 302.

In some embodiments, the storage portion may have connection points, such as holes, hooks, etc., suitable for use by a manned lift such as a forklift or other drive lift. For example, the storage portion may have slots or channels 308 for engagement by a forklift or other equipment. In embodiments where the base portion 302 and storage portion 304 are integral, lifting the storage portion 304 by the slots or channels 308 will also lift the base portion 302. In embodiments where the base portion 302 and the storage portion 304 are detachable, lifting the storage portion 304 by the slots or channels 308 may separate the storage portion 304 from the base portion 302 so that the storage portion may be moved independently of the base portion 302.

A plurality of inventory items 310 are held or stored by the bins or shelves 306. In some cases, the bins or shelves 306 may have adjustable dividers to provide separate spaces for different inventory items on individual bins or shelves 306.

The inventory holder 104 or the base portion 302 of the inventory holder 104 may have a plurality of legs 312 that extend downward from the base 302 to support the inventory holder on a floor or surface 314 of an inventory facility 102 and/or freight transporter 112. The legs 312 provide a space above the floor 314 and between each other so that the robotic drive unit 106 can maneuver itself beneath the base portion 302.

The robotic drive unit 106 may comprise a motorized lift having a plurality of wheels 316 and a lift surface 318. One or more of the wheels 316 may be driven to move the drive unit 106 over the floor or surface 314. One or more of the wheels 316 may be steerable to guide the drive unit 106 in different directions or paths.

The lift surface 318 may be configured to dock with the inventory holder 104 by raising the lift surface 318 into engagement with the base 302. In operation, the robotic drive unit 106 may be configured to maneuver itself beneath the inventory holder 104, to raise the inventory holder 104 off of the surface 314 and to move the inventory holder 104 to any desired location under the direction or in response to instructions from the management component 210. After reaching the desired location, the robotic drive unit 106 undocks from the inventory holder 104 by lowering the lift surface 318 and thereby placing the inventory holder 104 back on the floor 314.

Although FIG. 3 illustrates a particular embodiment of robotic drive unit 106 containing certain components and configured to operate in a particular manner, the robotic drive unit 106 may comprise any appropriate component and/or collection of components configured to transport and/or facilitate the transport of inventory holders 104.

Figure 4A:
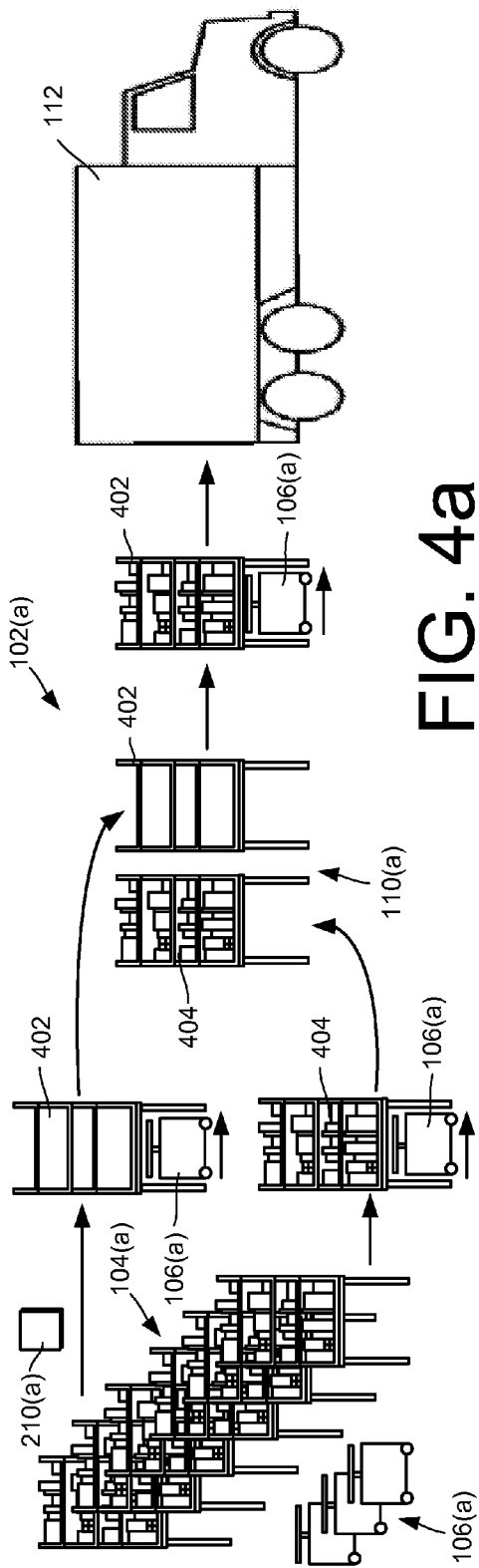
FIGS. 4a and 4b are flow diagrams illustrating handling and transport of inventory holders in conjunction with the systems of FIGS. 1 and 2.
Figure 4B:
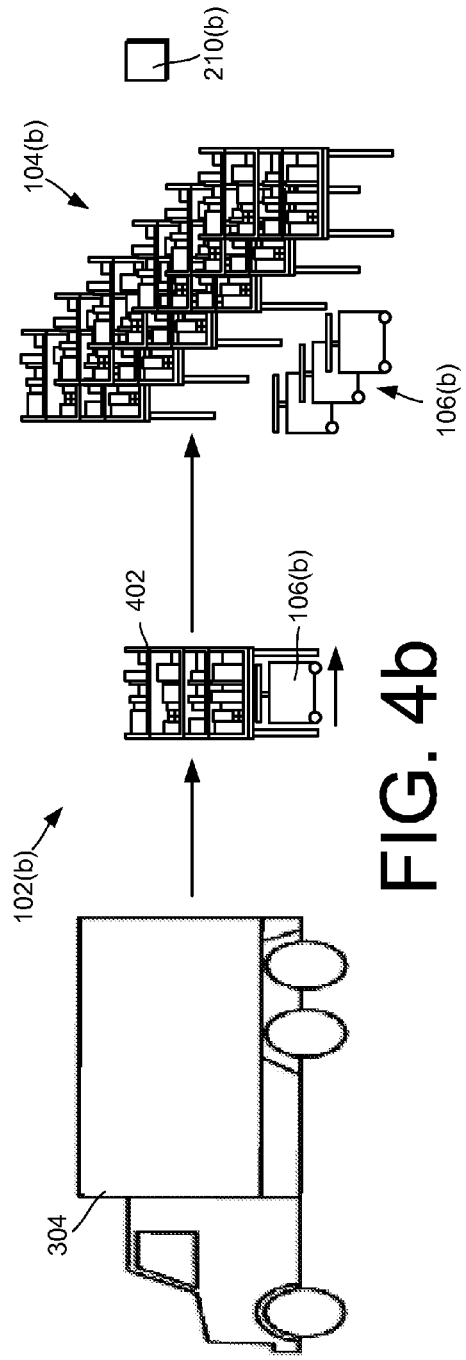

FIGS. 4a and 4b illustrate methods of transporting inventory items from a first inventory area or facility 102(a) to a second inventory area or facility 102(b) using an inter-area or inter-facility freight transporter 112 such as a truck or other road-based vehicle. The freight transporter may also comprise any other type of transport mechanism, including road vehicles, ships, aircraft, rail cars, shipping containers, cargo compartments, and so forth.

FIG. 4a illustrates actions performed at the first inventory facility 102(a). FIG. 4b illustrates actions performed at a second inventory facility or area 102(b). Actions of the robotic drive units 106 of the first inventory facility 102(a) are controlled by the management component 210(a) of the first inventory facility 102(a). Actions of the robotic drive units 106 of the second inventory facility 102(b) are controlled by the management component 210(b) of the second inventory facility 102(b). In some cases, the management components 210 of the first and second inventory facilities may communicate with each other to coordinate transfers between the facilities. Furthermore, the functionality of the management components 210 of the respective facilities may in some cases, in part or in whole, be implemented by a unified controller that is responsible for controlling the robotic drive units of both facilities.

Referring first to FIG. 4a, the first inventory facility 102(a) has a plurality of portable inventory holders 104(a) configured to store inventory items. The first inventory facility 102(a) also has a plurality of robotic drive units 106(a) that are controlled by a management component 210(a) of the first inventory facility 102(a) to move the inventory holders 104(a) within and about the first inventory facility 102(a).

In response to receiving an order or instruction to transfer inventory items from the first inventory facility 102(a) to the second inventory facility 102(b), one of the robotic drive units 106(a) is dispatched and instructed to move an empty one of the inventory holders 104(a), referred to herein as a receiving inventory holder 402 or transfer inventory holder 402, to a workstation 110(a) of the first inventory facility 102(a).

In addition, one or more of the robotic drive units 106(a) are dispatched and instructed to move one or more stocked inventory holders, referred by the reference numeral 404 in FIG. 4a, to the workstation 110(a). A human worker or automated system then moves specified inventory items from the one or more stocked inventory holders 404 to the receiving inventory holder 402. The selection and placement of inventory items may be supervised or directed by the management component 210 of the facility as described above. For example, indications may be provided informing the operator of the location of the stocked inventory holder 404 from which an item should be picked and the location of the receiving inventory holder 402 into which the picked item should be placed.

When all specified inventory items have been placed on the receiving inventory holder 402, one of the robotic drive units 106(a) is dispatched and instructed to move the receiving inventory holder 402 to the freight transporter 112. In some implementations, the robotic drive unit 106(a) may enter the freight transporter 112 and place the receiving inventory holder 402 on the freight transporter 112. In other cases, the robotic drive unit 106(a) may move the receiving inventory holder 402 to an area adjacent the inter-facility freight transporter 112, such as to the loading dock 204 shown in FIG. 2. From there, the receiving inventory holder 402 may be moved into the freight transporter 112 by a human worker using power equipment such as a forklift or other user-operated driven lift.

Multiple inventory holders 104(a) may be filled and loaded onto the freight transporter 112 in this manner, and the freight transporter may then be driven to the second inventory facility 102(b).

In certain instances, an order may specify that an existing stocked inventory holder 404 is to be transferred to the second facility. In this case, one of the robotic drive units 106(a) may be dispatched and instructed to move the stocked inventory holder 404 from its location in the facility directly into the waiting freight transporter 112.

In certain implementations, the robotic drive unit used to move the inventory holder to the freight transporter may remain on the freight transporter after moving the inventory holder, and may be transported to the destination facility for use within a destination inventory facility.

In certain implementations, as described above with reference to FIG. 3, an inventory holder 104 may comprise a base portion used to dock with the robotic drive unit 106 and a removable storage portion containing bins or storage compartments for inventory items. In such implementations, the removable storage portion may be removed from the base for placement into the freight transporter 112, thereby conserving vertical space within the storage compartment of the freight transporter 112.

Referring now to FIG. 4b, the second inventory facility 102(b) has a plurality of portable inventory holders 104(b) configured to store inventory items. The second inventory facility 102(b) also has a plurality of robotic drive units 106(b) that are controlled by a management component 210(b) of the second inventory facility 102(b) to move the inventory holders 104(b) within and about the second inventory facility 102(b).

The management component 210 of the first inventory facility may be configured to provide transfer data to the management component 210 of the second inventory facility. Transfer data may identify the inventory holders contained by the freight transporter. Transfer data may also identify inventory items held by the inventory holders and the locations of the inventory items on the inventory holders. In cases where drive units themselves are transported by the freight transporter, the transfer data may also identify the drive units.

Upon arrival of the freight transporter 112 at the second inventory facility 102(b), the management component 210(b) may dispatch a robotic drive unit 106(b) to move the receiving inventory holder 402 from the freight transporter 112 to a storage location within the second inventory facility 102(b). In some cases, the robotic drive unit 106(b) may be configured to enter the cargo compartment of the freight transporter 112 and to remove the receiving inventory holder 402 from the cargo compartment of the freight transporter 112. In other cases, a human operator may use a forklift or other user-operated lift to remove the receiving inventory holder 402 from the freight transporter 112 and to place the receiving inventory holder 402 on a loading dock adjacent the freight transporter 112. The robotic drive unit 106(b) may then be instructed to move the receiving inventory holder 402 from the loading dock to a storage location within the second inventory facility 102(b). In some cases, an upper portion of an inventory holder may be removed from the freight transporter 112 and placed on a base portion so that the inventory holder may subsequently be docked with and moved by the robotic drive unit 106(b).

Figure 5A:
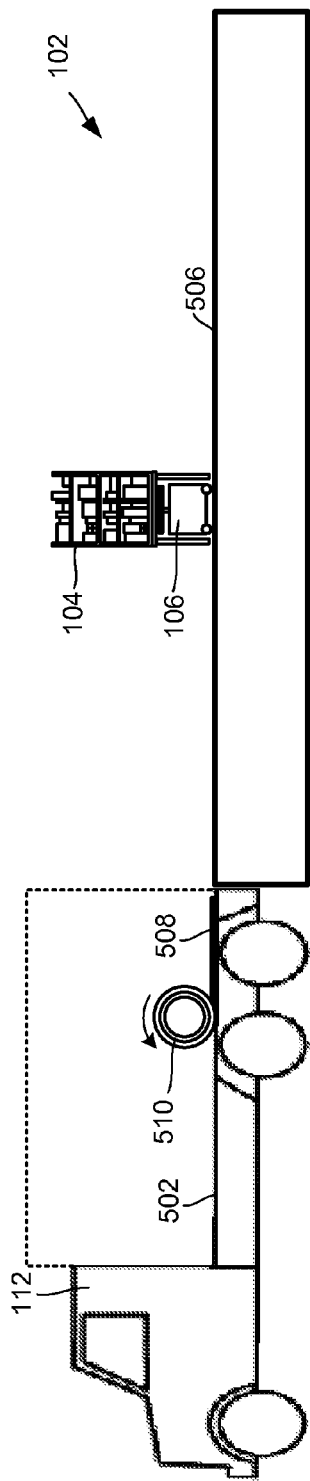
FIGS. 5a, 5b, and 5c are figurative views illustrating the use of fiducial marks for guidance and navigation of robot drive units in conjunction with the systems of FIGS. 1 and 2.
Figure 5B:
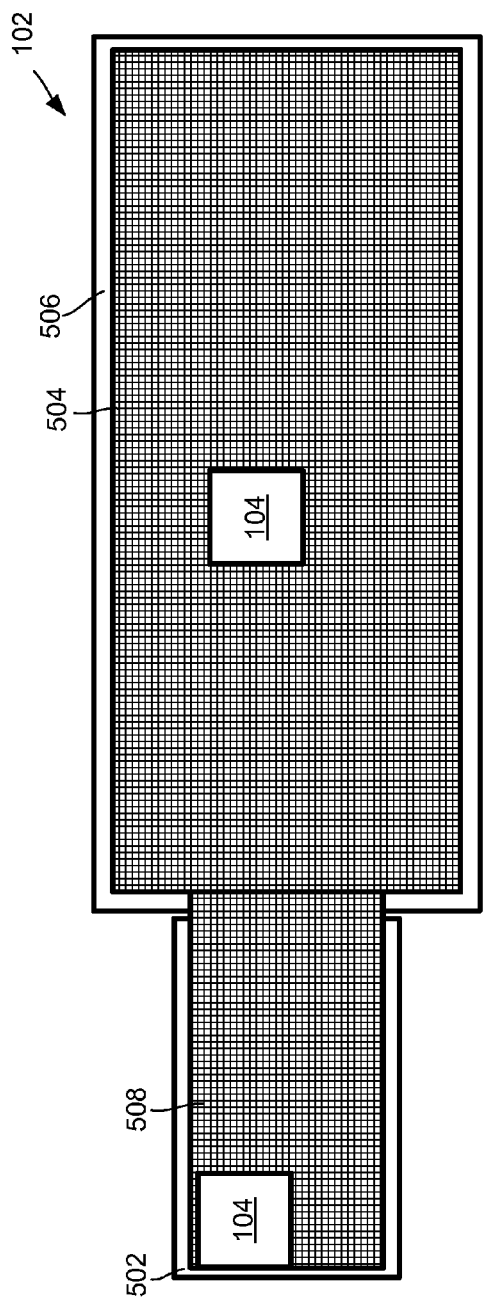

FIGS. 5a and 5b illustrate an example technique for navigating a robotic drive unit 106 onto and/or into a bed or interior 502 of a freight transporter 112, so that the robotic drive unit 106 can move an inventory holder 104 onto and/or into the freight transporter 112.

In certain implementations, a workspace 202 may include a number of fiducial marks 504 that mark points on a two-dimensional grid that covers all or a portion of the floor 506 of the workspace 202 The robotic drive units 106 in such implementations may include positioning sensors configured to detect the fiducial marks 504. The fiducial marks 504 may be used to indicate positions of the robotic drive units 106 within the workspace 202, and may be used by the robotic drive units 106 to navigate through the workspace 202.

When using the robotic drive units 106 to load items such as inventory holders 104 onto the bed or into the cargo area of the freight transporter 112, a mat or other surface 508 that has been prepopulated with fiducial marks may be permanently, temporarily, or removably placed on the bed 502 of the freight transporter 112 by a human worker before the robotic drive unit 106 enters the freight transporter 112. The robotic drive unit 106 may then sense the fiducial marks of the mat 508 and may use the fiducial marks for navigation and placement of the inventory holders 104 within the cargo area of the freight transporter 112.

As illustrated in FIG. 5a, the mat 508 may in some embodiments comprise a roll 510 of sheet-like material, which may be unrolled onto the bed 502 of the freight transporter 112, and which may be removed after use.

FIG. 5b shows a possible placement of the mat 508 on the bed 502 of the freight transporter 112. In this embodiment, a single mat 508 is configured to cover all or nearly all of the bed 502.

Figure 5C:
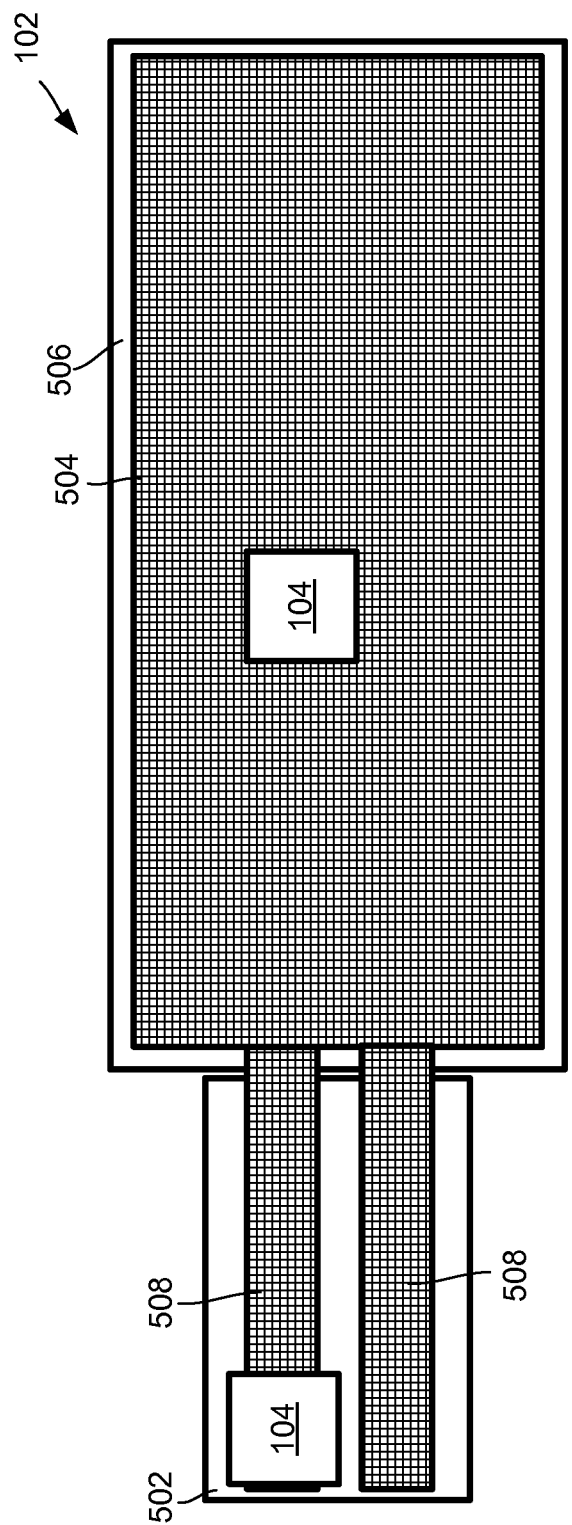

FIG. 5c shows another possible mat configuration. In this implementation, several fiducial mats 508 may be used within the bed 502. For example, multiple narrow mats 508 may be placed longitudinally, from front to rear of the bed 502, so that the legs 312 of the inventory holders 104 straddle the mats 508. Once the freight transporter 112 has been loaded with inventory holders 104, the mats 508 may be removed by pulling them from beneath the inventory holders 104.

In certain other embodiments, fiducial marks may be permanently placed on or affixed to the bed 502 of the freight transporter 112 or on other portion of the freight transporter 112 for use by the robotic drive units 106 when entering the bed 502 of the freight transporter 112.

Although a particular method of localizing drive units within a freight transporter is described above, various embodiments may utilize various different means for positioning the drive unit within the freight transporter.

Figure 6:
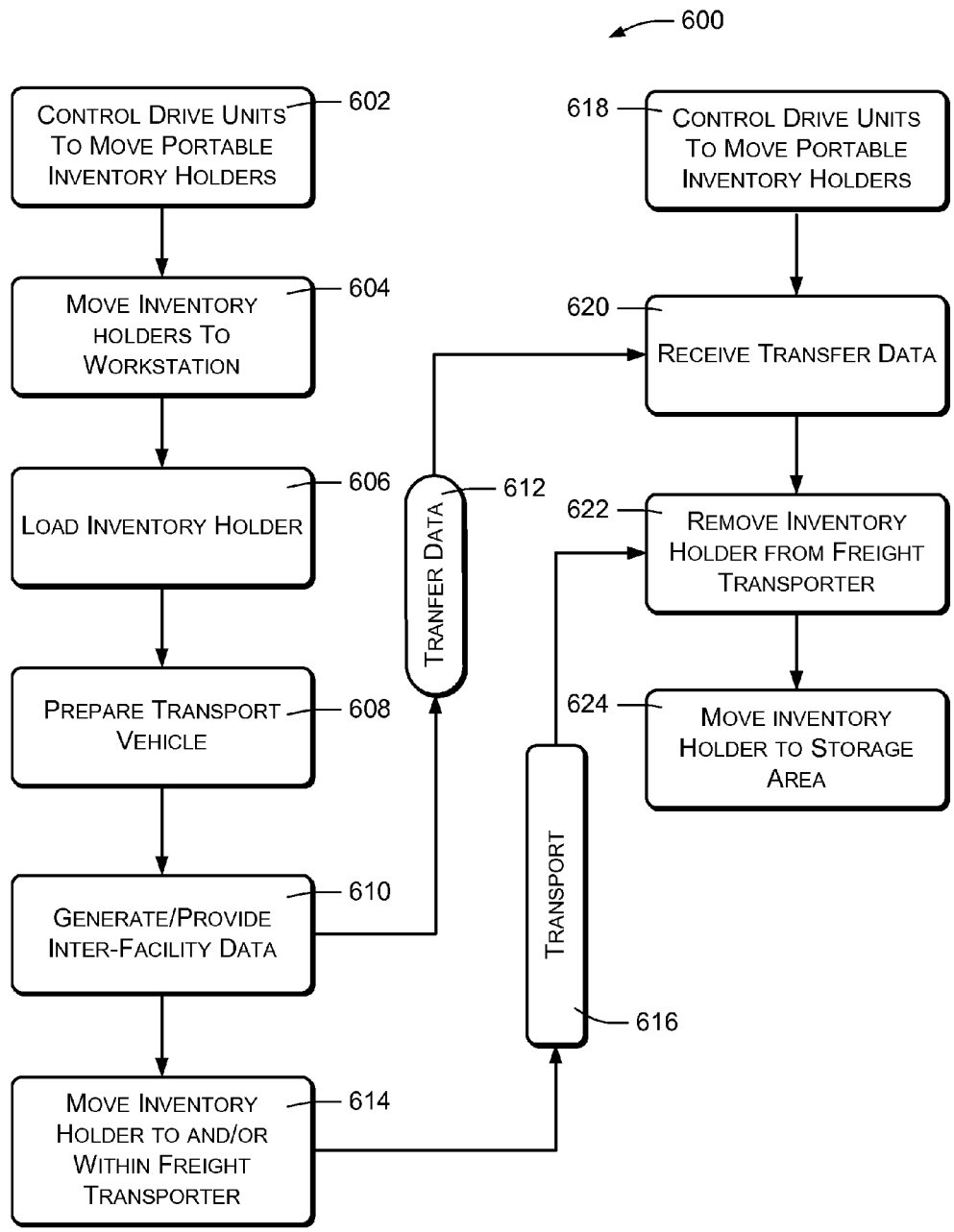
FIG. 6 is a flowchart showing an example method of handling inventory in conjunction with an inventory management and order fulfillment system.

FIG. 6 illustrates an example method 600 that may be performed in the environments described above to transfer inventory from a first inventory facility to a second inventory facility using elements of a mobile order fulfillment system. Actions shown along the left side of FIG. 6 are performed at the first inventory facility under the control or direction of first control logic such as the management component 210 mentioned above. Actions shown along the right side of FIG. 6 are performed at the second inventory facility under the control or direction of second control logic, which may similarly comprise an instance of the management component 210.

Although the method 600 is described in the context of the preceding figures, the method 600 may also be performed in other environments, in conjunction with various types of equipment and resources other than those that are specifically illustrated and mentioned. Furthermore, certain embodiments may omit one or more of the illustrated actions, and the actions may be ordered differently than illustrated.

An action 602 comprises controlling a plurality of unmanned robotic drive units to move portable inventory holders within a first inventory area for order fulfillment and/or other inventory management purposes. An action 604, performed by one or more of the robotic drive units, comprises moving one or more inventory holders to a workstation for transfer of inventory items between the inventory holders. The inventory holders may include one or more stocked inventory holders as well as a receiving inventory holder that will be transported by a freight transporter to a second inventory area.

An action 606 comprises loading the receiving inventory holder with inventory items that are to be shipped to the second inventory area. These inventory items may be loaded from other inventory holders or from other sources, by a human worker or by automated equipment as described above.

An action 608 may be performed in some situations, comprising preparing the freight transporter for navigation by robotic drive units. The action 608 may comprise placing fiducial marks within the freight transporter. In some situations, the action 608 may comprise temporarily positioning one or more removable fiducial mats within the freight transporter.

An action 610 may comprise preparing transfer data 612 indicating information regarding the receiving inventory holder and the items that have been placed in or on the receiving inventory holder. Specifically, the transfer data 612 may identify the inventory holder, such by a holder identifier (ID). In addition, the transfer data 612 may identify the inventory items held by the inventory holder, and the specific locations of the inventory items on the inventory holder. In some cases where drive units themselves are transported between facilities, the transfer data may also include a drive unit identifier (ID).

An action 614, performed by one or more of the robotic drive units, comprises moving the receiving inventory holder to and/or within the freight transporter. A robotic drive unit may be used in some situations to enter the freight transporter and place the receiving inventory holder into or onto the transport the freight transporter. In other situations, a robotic drive unit may place the receiving inventory holder near the freight transporter and other equipment may be used to move the receiving inventory holder or a portion of the receiving inventory holder into the freight transporter. In some cases, the robotic drive unit may remain on the freight transporter along with the receiving inventory holder. In other cases, the robotic drive unit may place the inventory holder on to the freight transporter and then exit the freight transporter for further use within the first inventory facility.

An action 616, performed by the freight transporter, comprises transporting the receiving inventory holder to the second inventory facility. In some cases, the action 616 may also comprise transporting the robotic drive unit that has been used to move the inventory holder.

At the second inventory facility, an action 618 comprises controlling a plurality of unmanned robotic drive units to move portable inventory holders for order fulfillment or other inventory management purposes. An action 620 may comprise receiving the transfer data that has been prepared and provided by the first inventory facility.

An action 622, performed upon arrival of the freight transporter, comprises removing the receiving inventory holder from the freight transporter. The action 622 may include entering the freight transporter with a robotic drive unit and removing the receiving inventory holder with the robotic drive unit. Alternatively, the inventory holder may be removed from the freight transporter by other means, such as by other types of manned and/or automated equipment, and the robotic drive unit may be used to move the inventory holder from the area of the freight transporter. In cases where the robotic drive unit has accompanied the inventory holder on the freight transporter, the action 622 may comprise using that robotic drive unit to remove the inventory holder from the freight transporter.

An action 624 comprises moving the inventory holder with a robotic drive unit to a storage area within the second inventory facility, from where it may be accessed to fulfill future orders at the second inventory facility. The management component of the second inventory facility may utilize the received transfer data to determine the identification of the inventory holder, its inventory items, and any robotic drive unit that has accompanied the inventory holder.

Figure 7:
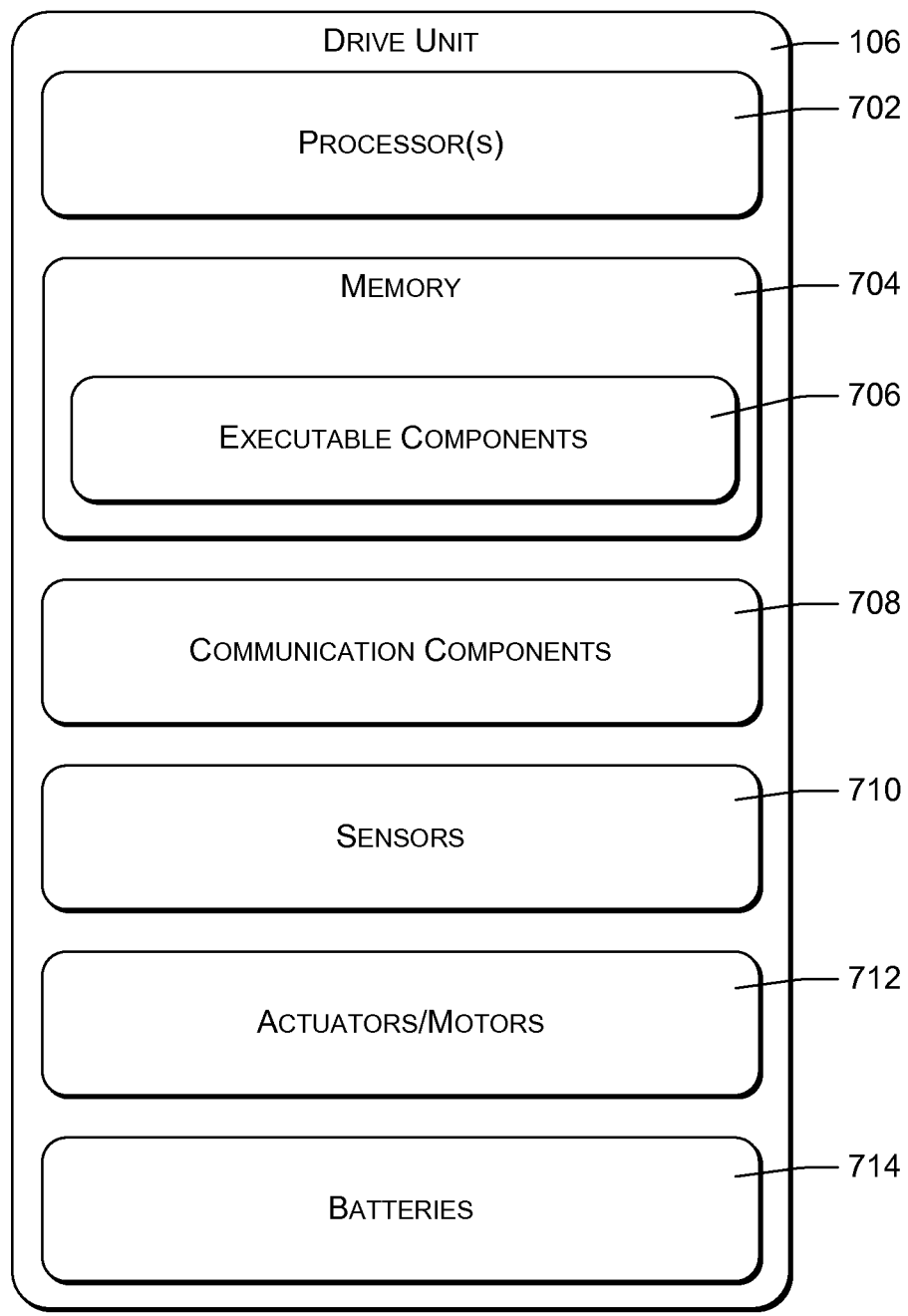
FIG. 7 is a block diagram illustrating example components of a robotic drive unit.

FIG. 7 shows relevant operational components of an example robotic drive unit 106 that may be used in conjunction with the techniques and systems described above. In a very basic configuration, an example drive unit 106 may have control logic in the form of one or more processors 702 and memory 704. Depending on the configuration of the drive unit and its control logic, the memory 704 may be a type of computer storage media and may include volatile and non-volatile memory. Thus, the memory 704 may include, but is not limited to, RAM, ROM, EEPROM, flash memory, or other memory technology.

The memory 704 may be used to store any number of executable components 706 that are executable by the processor(s) 702. In many embodiments, these executable components comprise instructions or programs that are executable by the processor(s) 702, and that when executed implement operational logic for performing the actions and functions described above.

Executable components stored in the memory 704 may include navigational components, communication components, components, power management components, device drivers, and other software or firmware. Generally, the drive unit 106 is configured through by means of the executable components 706 to receive and act upon instructions from the management component 210 and to provide status information back to the management component 210.

The drive unit 106 may have communication components 708 such as wireless networking components or other components for providing wireless communications between the drive unit 106 and the management component 210.

Physical components of the drive unit 106 may include multiple sensors 710 such as optical sensors, cameras, position sensors, gyroscopes, compasses, position receivers, accelerometers, microphones, and so forth. The sensors 710 may be used for navigational purposes or for other purposes such as identifying inventory holders 104, determining status of various system or device elements and subsystems, and so forth.

Physical components may also include one or more actuators and/or motors 712, which may be used for engaging or docking with inventory holders 104, moving the drive unit over a surface, and so forth. The drive unit 106 may also include batteries 714 or another type of energy storage device for operating the various components described above.

The drive unit 106 may of course include many other elements and components that are not shown.

Figure 8:
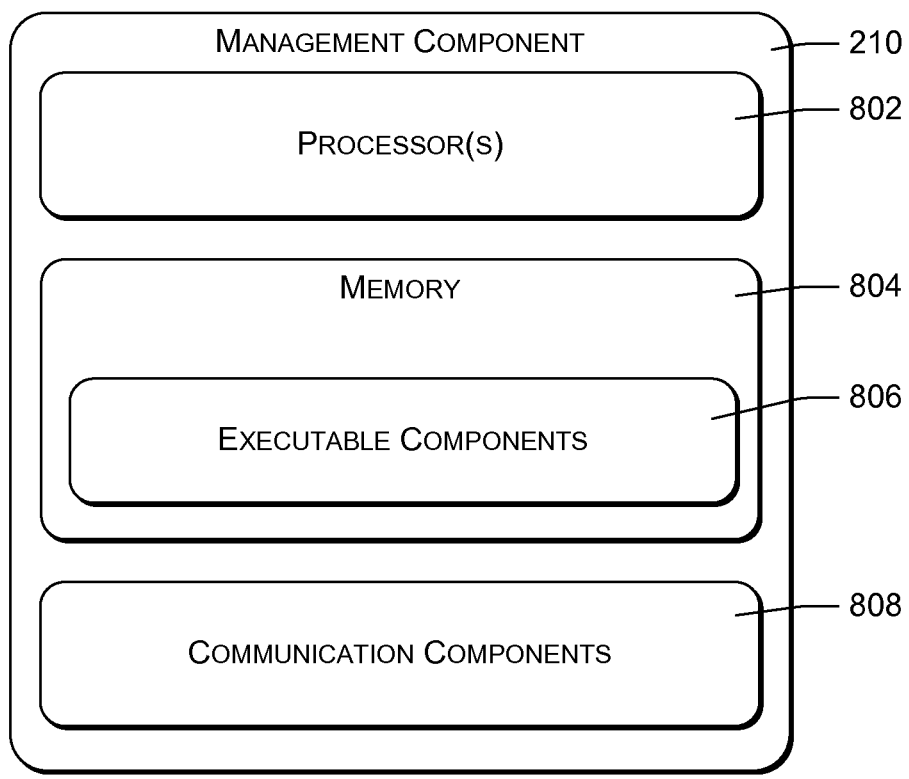
FIG. 8 is a block diagram illustrating example components of a management component.

FIG. 8 shows relevant operational components of an example management component 210 that may be used in conjunction with the techniques and systems described above. In a very basic configuration, an example management component 210 may have control logic in the form of one or more processors 802 and memory 804. Depending on the configuration of the management component 210 and its control logic, the memory 804 may be a type of computer storage media and may include volatile and nonvolatile memory. Thus, the memory 804 may include, but is not limited to, RAM, ROM, EEPROM, flash memory, or other memory technology.

The memory 804 may be used to store any number of executable components 806 that are executable by the processor(s) 802. In many embodiments, these executable components comprise instructions or programs that are executable by the processor(s) 802, and that when executed implement operational logic for performing the actions and functions described above.

Executable components stored in the memory 804 may be configured to manage multiple robotic drive units. For example, the management component may specify instructions, locations, paths, inventory holders, and other information to the robotic drive units. In addition, the management component may implement a database or other type of logic for managing inventory items and their storage within an inventory facility. In some embodiments, the management component 210 may be configured to coordinate and direct all or most automated activities relating to robotic drive units and associated inventory holders.

The management component 210 may have communication components 808 such as wireless networking components or other components for providing wireless communications between robotic drive units and the management component 210.

The management component 210 may of course include many other elements, components, and functionalities that are not specifically illustrated.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An order fulfillment system, comprising:
    a plurality of portable inventory holders configured to store inventory items in first and second inventory facilities;
    first unmanned drive units configured to move the portable inventory holders within the first inventory facility;
    second unmanned drive units configured to move the portable inventory holders within the second inventory facility;
    control logic configured to direct the first unmanned drive units to perform first actions comprising:
        moving a receiving one of the portable inventory holders to a workstation of the first inventory facility;
        moving one or more stocked ones of the portable inventory holders to the workstation for transfer of specified inventory items from the one or more stocked ones of the portable inventory holders to the receiving one of the portable inventory holders; and
        placing the receiving one of the portable inventory holders on an inter-facility freight transporter for transport to the second inventory facility by entering the inter-facility freight transporter with one of the first unmanned drive units; and
    the control logic being further configured to direct the second unmanned drive units to perform one or more second actions, the one or more second actions comprising:
        removing the receiving one of the portable inventory holders from the inter-facility freight transporter by entering the inter-facility transporter with one of the second unmanned drive units.

2. The order fulfillment system of claim 1, wherein:
    the control logic comprises first control logic configured to monitor inventory of the first inventory facility and second control logic configured to monitor inventory of the second inventory facility;
    the first control logic is configured to provide inventory data indicating inventory items held by the receiving one of the portable inventory holders; and
    the second control logic is configured to receive the inventory data for use in fulfilling orders at the second inventory facility from the receiving one of the portable inventory holders.

3. The order fulfillment system of claim 1, further comprising one or more fiducial surfaces configured for placement within the inter-facility freight transporter, the one or more fiducial surfaces having fiducial marks for navigation by the first and second unmanned drive units within the inter-facility freight transporter.

4. The order fulfillment system of claim 1, wherein:
    the unmanned drive units are configured to navigate based at least in part on fiducial marks on floors of the first and second inventory facilities; and
    fiducial marks are located on a floor of the inter-facility freight transporter for navigation by the unmanned drive units within the inter-facility freight transporter.

5. The order fulfillment system of claim 1, wherein the inter-facility freight transporter comprises one or more of the following:
    a road vehicle;
    a ship;
    an aircraft;
    a rail car;
    a shipping container; or
    a cargo compartment.

6. The order fulfillment system of claim 1, wherein the receiving one of the portable inventory holders comprises:
    a base portion that docks with the first and second unmanned drive units; and
    a storage portion that is detachable from the base portion for placement on the inter-facility freight transporter.

7. The order fulfillment system of claim 1, wherein the receiving one of the portable inventory holders comprises:
    a base portion that docks with the first and second unmanned drive units;
    a storage portion that is detachable from the base portion; and
    wherein the storage portion is configured to be moved by a manned lift for placement on the inter-facility freight transporter apart from the base portion.

8. A method, comprising:
    controlling unmanned drive units to move a plurality of portable inventory holders within a first inventory area, wherein the unmanned drive units are configured to navigate within the first inventory area based at least in part on fiducial marks placed within the first inventory area;
    moving a receiving one of the portable inventory holders to a workstation of the first inventory area with at least one of the unmanned drive units;
    moving one or more stocked ones of the portable inventory holders to the workstation with at least one of the unmanned drive units for transfer of specified inventory items from the one or more stocked ones of the portable inventory holders to the receiving one of the portable inventory holders;
    moving the receiving one of the portable inventory holders to a freight transporter with at least one of the unmanned drive units for transport of the receiving one of the portable inventory holders to a second inventory area; and
    based on fiducial marks placed in the freight transporter for navigation of the unmanned drive units in the freight transporter, navigating at least one of the unmanned drive units in the freight transporter.

9. The method of claim 8, further comprising placing the receiving one of the inventory holders on the freight transporter with one or more of the unmanned drive units.

10. The method of claim 8, wherein the freight transporter comprises one or more of:
    a road vehicle;
    a ship;
    an aircraft;
    a rail car;
    a shipping container; or
    a cargo compartment.

11. The method of claim 8, wherein the receiving one of the portable inventory holders comprises:
   a base portion that docks with the unmanned drive units; and
   a storage portion that is detachable from the base portion for placement in the freight transporter.

12. The method of claim 8, wherein the receiving one of the portable inventory holders comprises:
   a base portion that docks with the unmanned drive units; and
   a storage portion that is detachable from the base portion;
   wherein the storage portion is configured to be moved by a manned lift for placement on the freight transporter.

13. The method of claim 8, further comprising:
   placing one or more removable fiducial surfaces in the freight transporter, wherein the one or more removable fiducial surfaces have the fiducial marks in the freight transporter for navigation of the unmanned drive units in the freight transporter.

14. A method, comprising:
   controlling unmanned drive units to move a plurality of portable inventory holders within a first inventory area;
   moving a receiving one of the portable inventory holders to a workstation of the first inventory area with at least one of the unmanned drive units;
   moving one or more stocked ones of the portable inventory holders to the workstation with at least one of the unmanned drive units for transfer of specified inventory items from the one or more stocked ones of the portable inventory holders to the receiving one of the portable inventory holders;
   moving the receiving one of the portable inventory holders to a freight transporter with at least one of the unmanned drive units for transport of the receiving one of the portable inventory holders to a second inventory area; and
   providing inventory data for use at the second inventory area in fulfilling orders from the receiving one of the inventory holders, wherein the inventory data indicates inventory items held by the receiving one of the portable inventory holders.

15. The method of claim 14, further comprising placing the receiving one of the inventory holders on the freight transporter with one or more of the unmanned drive units.

16. The method of claim 14, wherein the receiving one of the portable inventory holders comprises:
   a base portion that docks with the unmanned drive units; and
   a storage portion that is detachable from the base portion for placement in the freight transporter.

17. A method, comprising:
   controlling a plurality of unmanned drive units to move a plurality of portable inventory holders within a first inventory area, wherein the unmanned drive units are configured to navigate within the first inventory area based at least in part on fiducial marks placed within the first inventory area;
   moving one or more of the portable inventory holders on to or off of a freight transporter with one or more of the unmanned drive units for transport of the one or more portable inventory holders between the first inventory area and a second inventory area; and
   based on fiducial marks placed within the freight transporter for navigation of the unmanned drive units within the freight transporter, navigating one or more of the unmanned drive units in the freight transporter.

18. The method of claim 17, further comprising:
   moving a receiving one of the portable inventory holders to a workstation of the first inventory area with at least one of the unmanned drive units;
   moving one or more stocked ones of the portable inventory holders to the workstation with at least one of the unmanned drive units for transfer of specified inventory items from the one or more stocked ones of the portable inventory holders to the receiving one of the portable inventory holders; and
   moving the receiving one of the portable inventory holders to the freight transporter with at least one of the unmanned drive units for transport of the receiving one of the portable inventory holders to the second inventory area.

19. The method of claim 17, further comprising transporting the one or more unmanned drive units and the one or more portable inventory holders between the first and second inventory areas by the freight transporter.

20. The method of claim 17, wherein the freight transporter comprises one or more of:
   a road vehicle;
   a ship;
   an aircraft;
   a rail car;
   a shipping container; or
   a cargo compartment.

21. The method of claim 17, wherein the portable inventory holder comprises:
   a base portion that docks with the unmanned drive units; and
   a storage portion that is detachable from the base portion for placement in the freight transporter; and
   wherein the storage portion is configured to be moved by a manned lift.

22. The method of claim 17, further comprising transferring inventory data between control logic of the first and second inventory areas, wherein the inventory data indicates inventory items held by the one or more of the portable inventory holders.

* * * * *